२,754,344

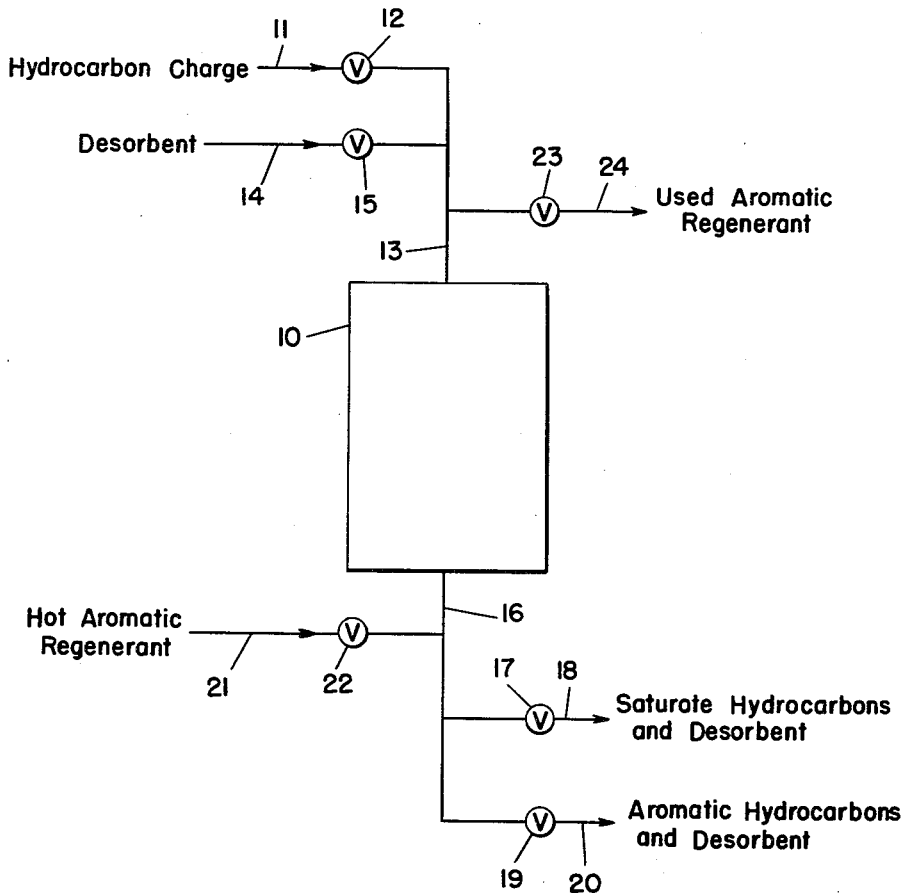

Patented July 10, 1956

2,754,344

REGENERATION OF ADSORBENT BEDS WITH HOT AROMATIC HYDROCARBON OIL

Earl R. Weatherly, Media, Pa., assignor to Sun Oil Company, Philadelphia, Pa., a corporation of New Jersey Application March 6, 1952, Serial No. 275,064

10 Claims. (Cl. 260—674)

This invention relates to the selective adsorption of hydrocarbons by means of silica gel.

It is known that the various classes of hydrocarbons in liquid form have differing adsorbabilities on silica gel and that liquid mixtures of hydrocarbons accordingly can be separated into hydrocarbon types by selective adsorption on this adsorbent. The hydrocarbons having the greater number of double bonds per molecule are adsorbed preferentially to those which have a lesser number of double bonds. Thus aromatic hydrocarbons are more strongly adsorbable than olefins while olefins are adsorbed in preference to saturates. The differing adsorptive properties have been utilized particularly for effecting the separation of various hydrocarbon mixtures, such as gasolines, naphthas, kerosene, gas oil and lubricating oil fractions, into aromatic-rich and aromatic-lean products.

Cyclic processes have been devised for carrying out such separations, in which processes the silica gel, after contact with the liquid hydrocarbon charge, is treated with another hydrocarbon liquid which functions as a desorbent and displaces hydrocarbon constituents which were adsorbed from the charge. For this purpose both aromatic and saturate hydrocarbons, or mixtures of aromatics and saturates, have been utilized. The hydrocarbon desorbent is selected with respect to boiling point so that it will boil outside of the range of the charge material. The silica gel after treatment with the desorbent can be re-used directly for contacting a further quantity of charge without any necessity for first removing desorbent which remains in it, such desorbent being displaced from the silica gel as it contacts the charge during the next operating cycle. Both the raffinate and extract products are obtained from such processes in admixture with desorbent and can readily be separated therefrom by distillation.

Processes as above described may be of the fixed bed type or may be conducted with the silica gel moving through a continuous system countercurrent to the hydrocarbon charge and the desorbent in successive zones. Various examples of such processes are described and claimed in the following patents: Lipkin Re. 23,005; Hirschler et al. 2,441,572, Lipkin 2,576,525; and Olsen 2,564,717.

It has been found that in treating the usual hydrocarbon fractions, such as straight run or catalytic gasolines, naphthas, gas oils, etc., in cyclic processes of the type above described, a gradual decline in the activity of the silica gel for adsorbing the aromatic components of the charge generally occurs, so that after sufficient cycles the operation will become uneconomic. This is usually due to the fact that the charge materials contain small amounts of polar compounds, such as nitrogen-, sulfur- and oxygen-containing components, which gradually accumulate on the silica gel and reduce its activity. The charge may also contain water which will be adsorbed by the silica gel and thereby reduce its effectiveness for achieving the desired aromatic separation. Some stocks, particlularly cracked stocks, contain olefinic components which tend to polymerize or otherwise react in the presence of silica gel and form material which adversely affects the efficiency of the gel.

Procedures which have been heretofore suggested for regenerating the used silica gel containing accumulated deactivating material include treatment with a highly polar solvent such as alcohol, steaming, blowing with hot air and the like. Such steps cannot readily be carried out in a large commercial installation and would require that expensive auxiliary equipment be provided.

The present invention provides a simple and inexpensive procedure for regenerating the silica gel after its activity for adsorbing the charge aromatics has declined to an undesirable level. It has now been found that the deactivating material retained by the silica gel during previous operation can readily be removed by treating the adsorbent with an aromatic hydrocarbon liquid at a temperature above that used in the previous operation. Any aromatic hydrocarbon liquid may be used for this purpose. It is preferable, however, to use either the aromatic product obtained from the previous cyclic operation or some of the desorbent if an aromatic desorbent was employed. This avoids any need for bringing in a material not already available in the operation.

The accompanying drawing diagrammatically illustrates one manner of practicing the invention in a process in which the silica gel is employed in the form of a fixed bed. Numeral 10 represents a column or other suitable container which is packed with silica gel. During normal use the column is operated in a cyclic process involving an adsorption step followed by a desorption step. In the first part of each cycle a suitable amount of hydrocarbon charge is introduced through line 11, valve 12 and line 13 into the gel bed. As the charge material passes through the silica gel, the aromatic hydrocarbons are selectively adsorbed so that the non-aromatics tend to travel ahead of and become separated from the aromatics. After the desired amount of charge has been introduced, valve 12 is closed and liquid hydrocarbon desorbent is fed into the gel bed through line 14, valve 15 and line 13. The desorbent may be an aromatic or a saturate hydrocarbon liquid or a mixture of aromatic and saturate hydrocarbons. Alternatively, two desorbents may be introduced in succession, the first being a saturate hydrocarbon which is used in amount sufficient only to displace the charge saturates retained with the adsorbed aromatics and the second being an aromatic hydrocarbon for desorbing the charge aromatics. Following the introduction of desorbent, valve 15 is closed and an additional quantity of charge is fed through line 11 to begin a new cycle.

The effluent which leaves column 10 via line 16 is segregated during each cycle into two portions. The portion representing the initial part of the cycle contains the charge saturates in admixture with desorbent displaced from the silica gel and is withdrawn through valve 17 and line 18. This portion is sent to a distillation zone (not shown) for recovering the desorbent for re-use and obtaining the non-aromatic product of the process. The other portion, which corresponds to the later part of the cycle, contains the charge aromatics in admixture with desorbent and is withdrawn through valve 19 and line 20 for subsequent distillation (not shown) to obtain the aromatic product.

During continued cyclic operation in the manner above described, deactivating compounds present in small amounts in the charge gradually accumulate in the silica gel and reduce its adsorptive capacity. When the adsorptive capacity has declined to an undesirable or uneconomic level, the foregoing operation is stopped and the silica gel is regenerated by treating it with a hot aromatic liquid. In carrying out such regeneration it is distinctly advantageous to pass the aromatic regenerant through the silica gel in a direction opposite from that employed during the normal cyclic operation. This is due to the fact that the deactivating compounds tend to accumulate at highest concentration near the inlet end of column 10, so that reversed flow during regeneration provides the shortest path for displacing the deactivating material from the silica gel bed. The amount of aromatic regenerant required accordingly is reduced by regenerating in this manner. Thus as shown in the accompanying drawing, hot aromatic regenerant is fed through line 21, valve 22 and line 16 into the bottom of column 10 and flows upwardly through the column. The mixture of regenerant and displaced deactivating material leaves the column through line 13 at the top and is removed through valve 23 and line 24.

For effective displacement of the deactivating material from the silica gel the regenerant should be introduced at a temperature at least 50° F. higher than the temperature at which the desorbent was introduced during the normal cyclic operation, and preferably at a temperature at least 100° F. higher. For example, if the cyclic operation is conducted at normal ambient temperatures or moderately elevated temperatures such as within the range of 50–150° F., the aromatic regenerant may be heated to a temperature of 200° F. or higher to effect the regeneration. Considerably higher temperatures may be used if desired but the temperature, of course, should be below that at which water of hydration (as distinguished from adsorbed water) would be removed from the silica gel, this generally being about 550° F. As a usual rule, increasing the temperature of the regenerant increases its effectiveness in displacing the deactivating material and accordingly reduces the quantity required.

The amount of regenerant that should be used will vary dependent upon the charge stock that has been treated, the number of cycles carried out in the preceding operation and the temperature at which the regeneration is conducted. The proper amount usually can be readily ascertained in any given instance by noting the color of the used regenerant as it flows from the column. The deactivating material generally has a dark color even though the charge stock may have been essentially colorless and therefore will darken the regenerant. The introduction of regenerant should be continued until it no longer undergoes a change in color in passing through the adsorbent bed. With the usual charge stocks, the amount of hot aromatic regenerant that should be used will lie within the range of 1–5 gallons per pound of silica gel.

The used regenerant may, if desired, be recovered from the deactivating material in any suitable manner, as by distillation or by filtration through an inexpensive adsorbent such as clay. It is usually more economic however, merely to dispose of the relatively small quantity occasionally produced in some suitable manner within the refinery, such as by blending it into motor gasoline. This eliminates any necessity for providing auxiliary equipment required to recover the regenerant.

The following examples are illustrative of the invention:

*Example 1*

A cyclic adsorption-desorption operation was conducted for separating the aromatics from a 205–302° F. fraction derived from catalytic gasoline and containing 30% aromatics and 14% olefins. In each cycle the charge was introduced into a column packed with silica gel, the amount of charge being equivalent to 0.053 gal./lb. of gel, after which pentane in amount of 0.23 gal. per lb. of gel was introduced as desorbent. Both the charge and desorbent were introduced to the column at approximately room temperature and the direction of flow was from top to bottom. This operation was continued for 985 cycles, at which time the adsorptive capacity of the gel for aromatics had dropped to 82% of the original capacity. The cyclic operation was then discontinued and the silica gel was regenerated by flowing hot benzene in liquid phase through the gel bed from bottom to top. The benzene was introduced at a temperature of 230° F. and a total of 1.5 gals./lb. of gel was passed through the bed. This treatment raised the adsorptive capacity to 97% of the original.

After the foregoing regeneration cyclic operation was started again with the same operating conditions being maintained. After 800 further cycles the adsorptive capacity of the silica gel again had dropped to 82% of the original capacity. Cyclic operation was again stopped and 1.5 gals. of benzene per lb. of gel was passed through the column from bottom to top. In this instance the benzene was introduced at room temperature. The initial benzene effluent from the column was colored, but it became water white before 1.5 gals./lb. had passed through the gel. The activity was raised only to 89% of the original. This shows that the unheated regenerant effected some regeneration but was incapable of displacing substantially all of the deactivating material accumulated in the adsorbent. Accordingly, an additional amount of benzene equivalent to 1.5 gals./lb. of gel was passed through the bed at a temperature of 230° F. This effected complete regeneration, the adsorptive capacity being brought back to 100% of the original value.

*Example 2*

A 150–325° F. catalytic gasoline containing 42% aromatics and 9% olefins was treated with silica gel in another cyclic operation employing benzene as the desorbent. In each cycle charge stock and benzene, each at room temperature, were introduced into the top of a silica gel bed in amounts, respectively, of 0.058 and 0.076 gal./lb. of gel. After 1025 cycles the adsorptive capacity for aromatics had dropped to 74% of the original value. The cyclic operation was then stopped and benzene as regenerant was introduced into the bottom of the column at a temperature of 270° F. After 1.5 gals./lb. of gel had been passed through the bed, the adsorptive capacity had been increased to 89% of the original. At this time the benzene effluent was still colored due to the presence of displaced deactivating material. This shows that the use of a larger amount of benzene would have effected more completely regeneration.

*Example 3*

The following example shows that regeneration of the silica gel can be accomplished according to the invention when the loss in adsorptive capacity is due to water. This condition might arise due to the presence of a small amount of water in the charge stock or due to an upset condition in plant operation resulting in a sudden inadvertent introduction of water in relatively large amount into the gel bed.

Water vapor was introduced into a column packed with silica gel until it had adsorbed 3.3% by weight. This caused its capacity for adsorbing aromatics to decrease to 92% of the original value. The gel was then regenerated by means of liquid benzene at about 300° F., employing 2.0 gals./lb. of gel. This treatment brought the adsorptive capacity back to 100%.

While the foregoing description has been directed largely to adsorption-desorption operation of the fixed bed type, it will be understood that the invention is also applicable to operations in which the adsorbent is moved through the adsorption and desorption zones either in the form of moving beds or as particles falling countercurrent to liquid. Various other deviations from the specific description set forth above are permissible without departing from the scope of the invention.

I claim:

1. In a process for separating hydrocarbons by selective adsorption, which process comprises a cyclic operation including the steps of treating a liquid hydrocarbon charge with silica gel to effect selective adsorption, desorbing the adsorbed hydrocarbon by means of a liquid hydrocarbon desorbent and reusing the resulting desorbent-containing silica gel for treatment of a further quantity of the hydrocarbon charge, said steps being carried out at relatively low temperature above 50° F., and in which process the silica gel undergoes deactivation due to accumulation therein of deactivating material, the improvement which comprises periodically interrupting such cyclic operation when the activity of the silica gel has decreased to an undesirable level, treating the silica gel with an essentially aromatic hydrocarbon liquid at a relatively high temperature of at least 200° F. and at least 50° F. higher than the temperature at which said desorbent was introduced during said cyclic operation, and in amount to substantially remove said deactivating material, thereby reactivating the adsorbent, and then using the treated silica gel, wet with said aromatic hydrocarbon liquid, to resume said cyclic operation at relatively low temperature.

2. In a process for separating hydrocarbons by selective adsorption, which process comprises a cyclic operation including the steps of flowing a liquid hydrocarbon charge at a relatively low temperature above 50° F. through a fixed bed of silica gel to effect selective adsorption, flowing a liquid hydrocarbon desorbent in the same direction through the bed at a relatively low temperature above 50° F. to effect desorption of the adsorbed hydrocarbon and re-using the resulting desorbent-containing bed of silica gel for treatment of a further quantity of the hydrocarbon charge, and in which process the silica gel undergoes deactivation due to accumulation therein of deactivating material, the improvement which comprises periodically interrupting such cyclic operation when the activity of the silica gel has decreased to an undesirable level, introducing to the silica gel bed an essentially aromatic hydrocarbon liquid at a relatively high temperature of at least 200° F. and at least 50° F. higher than the temperature at which said desorbent was introduced during said cyclic operation and flowing the same through the bed in a direction opposite from the charge flow direction and in amount to substantially remove said deactivating material, thereby reactivating the adsorbent, and then using the treated silica gel, wet with said aromatic hydrocarbon liquid, to resume said cyclic operation.

3. In a process for separating hydrocarbons by selective adsorption, which process comprises a cyclic operation including the steps of treating a liquid hydrocarbon charge at a temperature of 50–150° F. with silica gel to effect selective adsorption, desorbing the adsorbed hydrocarbon by means of a liquid hydrocarbon desorbent at a temperature of 50–150° F. and re-using the resulting desorbent-containing silica gel for treatment of a further quantity of the hydrocarbon charge, and in which process the silica gel undergoes gradual deactivation due to accumulation therein of deactivating material present in small amount in the hydrocarbon charge, the improvement which comprises periodically interrupting such cyclic operation when the activity of the silica gel has decreased to an undesirable level, treating the silica gel with an essentially aromatic hydrocarbon liquid at a temperature of at least 200° F. and in amount to substantially remove said deactivating material, thereby reactivating the adsorbent, and then using the treated silica gel, wet with said aromatic hydrocarbon liquid, to resume said cyclic operation.

4. In a process for separating hydrocarbons by selective adsorption, which process comprises a cyclic operation including the steps of flowing a liquid hydrocarbon charge at a temperature of 50–150° F. through a fixed bed of silica gel to effect selective adsorption, flowing a liquid hydrocarbon desorbent at a temperature of 50–150° F. in the same direction through the bed to effect desorption of the adsorbed hydrocarbon and re-using the resulting desorbent-containing bed of silica gel for treatment of a further quantity of the hydrocarbon charge, and in which process the silica gel undergoes gradual deactivation due to accumulation therein of deactivating material present in small amount in the hydrocarbon charge, the improvement which comprises periodically interrupting such cyclic operation when the activity of the silica gel has decreased to an undesirable level, introducing to the silica gel bed an essentially aromatic hydrocarbon liquid at a temperature of at least 200° F. and flowing the same through the bed in a direction opposite from the charge flow direction and in amount of between 1 and 5 gals./lb. of silica gel, thereby substantially removing said deactivating material, and then using the treated silica gel, wet with said aromatic hydrocarbon liquid, to resume said cyclic operation.

5. In the separation of aromatic hydrocarbon from a hydrocarbon charge containing the same, the process which comprises contacting silica gel at relatively low temperature above 50° F. in a cyclic operation alternately with liquid hydrocarbon charge to selectively adsorb aromatic hydrocarbon and with an aromatic desorbing liquid which boils outside of the charge boiling range to desorb the charge aromatic, recovering from the effluent from such contacting charge aromatic as aromatic product of the operation, periodically interrupting said cyclic operation when the activity of the silica gel has decreased to an undesirable level due to accumulation therein of deactivating material, treating the silica gel at relatively high temperature of at least 200° F. and at least 50° F. higher than the temperature at which said aromatic desorbing liquid was introduced during said cyclic operation, with said aromatic desorbing liquid in amount to substantially remove said deactivating material, thereby reactivating the absorbent, and then using the treated silica gel, wet with said aromatic desorbing liquid, to resume said cyclic operation at relatively low temperature.

6. Process according to claim 5 in which said relatively low temperature is in the range of 50–150° F.

7. In the separation of aromatic hydrocarbon from a hydrocarbon charge containing the same, the process which comprises a cyclic operation of alternately flowing through a fixed bed of silica gel at relatively low temperature above 50° F. and in one direction a liquid hydrocarbon charge to selectively adsorb aromatic hydrocarbon and an aromatic desorbing liquid which boils outside of the charge boiling range to desorb the charge aromatic, recovering from the effluent from the bed charge aromatic as aromatic product of the operation, periodically interrupting said cyclic operation when the activity of the silica gel has decreased to an undesirable level due to accumulation therein of deactivating material, passing through the silica gel bed at relatively high temperature of at least 200° F. and at least 50° F. higher than the temperature at which said aromatic desorbing liquid was introduced during said cyclic operation, and in a direction opposite from that of charge flow said aromatic desorbing liquid in amount to substantially remove said deactivating material, thereby reactivating the adsorbent, and then using the treated silica gel, wet with said aromatic desorbing liquid, to resume said cyclic operation at relatively low temperature.

8. In the separation of aromatic hydrocarbon from a hydrocarbon charge containing the same, the process which comprises contacting silica gel at relatively low temperature in the range of 50–150° F. in a cyclic operation alternately with liquid hydrocarbon charge to selectively adsorb aromatic hydrocarbon and with an aromatic desorbing liquid which boils outside of the charge boiling range to desorb the charge aromatic, recovering from the effluent from such contacting charge aromatic as aromatic product of the operation, periodically interrupting said cyclic operation when the activity of the silica gel has decreased to an undesirable level due to accumulation therein of deactivating material, treating the silica gel at relatively high temperature of at least 200° F. and at least 50° F. higher than the temperature at which said aromatic desorbing liquid was introduced during said cyclic operation, with said aromatic product in amount to substantially remove said deactivating material, thereby reactivating the adsorbent, and then using the treated silica gel, wet with said aromatic product, to resume said cyclic operation at relatively low temperature.

9. Process according to claim 8 in which said relatively low temperature is in the range of 50–150° F.

10. In the separation of aromatic hydrocarbon from a hydrocarbon charge containing the same, the process which comprises a cyclic operation of alternately flowing through a fixed bed of silica gel at relatively low temperature in the range of 50–150° F. and in one direction a liquid hydrocarbon charge to selectively adsorb aromatic hydrocarbon and an aromatic desorbing liquid which boils outside of the charge boiling range to desorb the charge aromatic, recovering from the effluent from the bed charge aromatic as aromatic product of the operation, periodically interrupting said cyclic operation when the activity of the silica gel has decreased to an undesirable level due to accumulation therein of deactivating material, passing through the silica gel bed at relatively high temperature of at least 200° F. and at least 50° F. higher than the temperature at which said aromatic desorbing liquid was introduced during said cyclic operation, and in a direction opposite from that of charge flow said aromatic product in amount to substantially remove said deactivating material, thereby reactivating the adsorbent, and then using the treated silica gel, wet with said aromatic product, to resume said cyclic operation at relatively low temperature.

References Cited in the file of this patent

UNITED STATES PATENTS

| | | |
|---|---|---|
| 1,633,871 | Prutzman | June 28, 1927 |
| 1,890,255 | Fuller | Dec. 6, 1932 |
| 2,162,202 | Fuchs | June 13, 1939 |
| 2,395,491 | Mavity | Feb. 26, 1946 |
| 2,398,101 | Lipkin | Apr. 9, 1946 |
| 2,564,717 | Olsen | Aug. 21, 1951 |
| 2,571,936 | Patterson et al. | Oct. 16, 1951 |

FOREIGN PATENTS

| | | |
|---|---|---|
| 427,805 | Germany | Apr. 20, 1926 |